United States Patent [19]

Sanjay et al.

[11] Patent Number: 6,143,692
[45] Date of Patent: *Nov. 7, 2000

[54] ADSORBENT

[75] Inventors: Hyderabed G. Sanjay; Kailash C. Srivastava, both of Centreville; Daman S. Walia, Clifton, all of Va.

[73] Assignee: Arctech, Inc., Chantilly, Va.

[*] Notice: This patent is subject to a terminal disclaimer.

[21] Appl. No.: 09/233,036

[22] Filed: Jan. 20, 1999

Related U.S. Application Data

[63] Continuation of application No. 08/698,122, Aug. 15, 1996, Pat. No. 5,906,960
[60] Provisional application No. 60/002,378, Aug. 15, 1995.

[51] Int. Cl.[7] .................................................. B01J 20/22
[52] U.S. Cl. .................................................. 502/401
[58] Field of Search ............................................ 502/401

[56] References Cited

U.S. PATENT DOCUMENTS

| | | |
|---|---|---|
| 913,922 | 3/1909 | Shields . |
| 2,199,767 | 5/1940 | Wells et al. . |
| 3,422,569 | 1/1969 | Lyon . |
| 3,767,531 | 10/1973 | Olson et al. ............................... 195/63 |
| 3,830,799 | 8/1974 | Van Reesma . |
| 3,872,002 | 3/1975 | Musgrove ................................. 210/59 |
| 3,903,074 | 9/1975 | Van Reesema .......................... 260/213 |
| 3,932,494 | 1/1976 | Yoshida et al. ....................... 260/502.6 |
| 4,081,401 | 3/1978 | Takegami et al. . |
| 4,081,403 | 3/1978 | Takegami et al. . |
| 4,113,567 | 9/1978 | Masri et al. ............................... 195/63 |
| 4,317,670 | 3/1982 | Khoroshavin et al. . |
| 4,626,416 | 12/1986 | DeVoe et al. .............................. 423/12 |
| 4,654,322 | 3/1987 | Holbein et al. .......................... 502/403 |
| 4,999,202 | 3/1991 | Cronje et al. . |
| 5,314,638 | 5/1994 | Morine et al. . |
| 5,492,723 | 2/1996 | Sanderson et al. . |
| 5,520,482 | 5/1996 | Oeste et al. ............................... 405/52 |
| 5,580,770 | 12/1996 | De Filippi . |
| 5,626,881 | 5/1997 | Lown ...................................... 424/520 |
| 5,670,345 | 9/1997 | Srivastava et al. ........................ 435/75 |

*Primary Examiner*—Tom Dunn
*Assistant Examiner*—Cynthia Donley
*Attorney, Agent, or Firm*—Browdy and Neimark

[57] ABSTRACT

An adsorbent that can be used to remove environmental contaminants such as organics, cations and anions in a single process step is prepared from humic acid. The adsorbent can be a soluble humic acid in liquid form (e.g., in aqueous solution) or the humic acid can be insolubilized and/or immobilized on a solid support. The adsorbent can also be used to recover agriculturally desirable metals in chelated form from contaminated water. The liquid form of the adsorbent can be used to wash solids to remove contaminants.

9 Claims, 17 Drawing Sheets ns. The humic
ADSORBENT

CROSS REFERENCE TO RELATED APPLICATIONS

This application is a continuation of U.S. application no. 08/698,122, filed Aug. 15, 1996, now U.S. Pat. No. 5,906,960 which claims priority from provisional application 60/002,378, filed Aug. 15, 1995, the entire contents of which are hereby incorporated by reference.

FIELD OF THE INVENTION

The present invention is directed to an adsorbent based on humic acid which can be used to remove metals, radionuclides, and/or organic materials generally present as environmental contaminants at a variety of sites.

BACKGROUND OF THE INVENTION

Heavy metal and organic contamination of soils, buildings and equipment systems is a major environmental concern at both industrial and government sites. The contamination is primarily due to improperly disposed industrial wastes. The presence of toxic heavy metal ions, volatile organic compounds and pesticides in the environment is of great concern and could affect worker safety as well as the safety of drinking water and air for the general public.

Federal and state pollution control standards for heavy metal content of mineral-producing discharges and for other types of waste disposal have become increasingly stringent. In addition, acid mine runoff contaminated with dissolved metals from abandoned mines contributes to environmental degradation. Other sources of contamination include discharge from federal facilities, e.g., military weapons complexes, which are a source of metals, organics, and radionuclides. Additional sources of contamination include oil and gas exploration and production operations. Where dissolved metals must be removed from such a waste stream prior to discharge, precipitation is the most common method, generally precipitating the metals by adding calcium oxide. Although calcium oxide addition is relatively simple and cheap, this method results in a great volume of sludge which is costly and hazardous to dispose of. Moreover, because of incomplete reaction, the effluent is often not completely removed from the water, and the metal values are not recovered and are thereby wasted. Also, the precipitation layer in settling ponds undergoes an inversion at temperatures around 4° C.

Many waters are contaminated with mixed wastes, which conventionally are treated with activated carbon followed by elution through ion exchange resin columns. Because these two methods operate on different principles, both technologies are applied sequentially, rather than simultaneously. This conventional technology is very expensive and cumbersome to use.

In Bureau of Mines Report of Investigations, 9200, Pahlman et al. describe the use of lignochemicals and humic acids to remove heavy metals from process waste streams. The sodium salt of lignin and the humic acids of peat, lignite, and subbituminous coal were found to be excellent at removing the more toxic heavy metal ions, including $Cd^{+2}$, $Pb^{+2}$ and $Hg^{+2}$, while calcium oxide addition was found to be poor to fair for their removal. However, the coagulability of the heavy metal sequestrates of the lignin sodium salt at pH 7 makes removal less efficient and causes difficulty in filtration.

Pahlman et al. found that a mixture of three humic acids has a particular affinity for $Cd^{+2}$, $Hg^{+2}$ and Pb+2, and can be used to effect almost total removal of these ions from waste streams. The humic acids used were prepared by caustic treatment of a North Dakota lignite, a Montana subbituminous coal, and a Minnesota peat.

Alexander, in U.S. Pat. No. 5,034,045, describes a method for improving agricultural crop yields using a mixture of a water-soluble alkali metal salt of humic acid and plant nutrient components such as nitrogen, potassium, and/or phosphorus. In this case, the oxidized sites of humic acid are filled with non-volatile alkali metal ions that maintain the water solubility of the humate salt used.

Moran, in U.S. Pat. No. 4,459,149, discloses a process for treating humus materials comprising freeing humic acid from the combined state in which it frequently exists in humus materials, dispersing it as a fine, insoluble solid in acid process water, separating it from the impurities with which it is associated, and recovering it as a high solids filter cake. The humic acid can be solubilized by mixing with solubilizing agent such as alkaline salts and the like. Insoluble humates are obtained by adding a metal compound to a humate solution.

Muir, in U.S. Pat. No. 4,952,229, discloses a soil and foliar supplement for plants comprising a quantity of specific microbes and an organic acid such as humic acid, fulvic acid and ulvic acid, along with optional trace minerals and chelated micronutrients.

Although activated carbon is very effective in removing organic compounds, it is associated with high capital and operating costs, especially when regeneration is effected by the most effective process, thermal reactivation. Also, this technique is very sensitive to the presence of suspended solids, oil and grease, requiring pretreatment for effective performance.

Although conventional means for decontaminating surface and groundwater include a broad spectrum of treatment options such as precipitation, ion-exchange, microbial digestion, membrane separation, activated carbon absorption, etc., the state of the art technologies can in one pass remediate only one class of contaminants, i.e., either volatile organic compounds using activated carbon or heavy metals using ion exchange. This requires the use of at least two different stepwise processes to remediate a site.

SUMMARY OF THE INVENTION

It is an object of the present invention to overcome the aforesaid deficiencies in the prior art.

It is an object of the present invention to provide an adsorbent which adsorbs anions, cations, and volatile organic compounds from contaminated objects and sites, such as from water, equipment, buildings, soil, ground water, oil and gas exploration and production sites, and similar sites.

It is another object of the present invention to provide a method to remove organic compounds, metal ions, and anions when present, either singly or in combination, from waste, process, or runoff streams.

Another object of the present invention is to recover agriculturally valuable metals from contaminated waters and to market the metals as chelated micronutrients.

Still another object of the present invention is to recover commercially valuable metals from contaminated waters.

According to the present invention, a sorbent is provided that can be used to treat organic compounds, or both organics and metal ions in a single process step or in a series of steps. As compared to conventional methods of reclamation, which include separate steps using, e.g., both carbon adsorption and ion exchange resins, the process of the present invention is less expensive and easier for treating all types of process streams.

The adsorbent of the present invention is based upon humic acid. The humic acid may be used either in a water soluble or water insoluble form, depending upon the contaminants to be removed, the concentration of the contaminants, and the use to which the adsorbent/contaminants complex is to be put. If the water stream to be cleaned contains metal ions useful for agricultural purposes, such as iron, zinc, copper, boron, manganese, magnesium, molybdenum and other agriculturally useful metals in high enough concentration to be economically recoverable, then the method of recovery comprises mixing water soluble humic acid with the water to be cleaned. The water soluble humic acid will chelate the metals to be recovered and form an insoluble humate. The insoluble humate is recovered from the water by sedimentation followed by filtration or other separation means and is useful as a source of chelated micronutrients for agriculture. If the agriculturally viable metal content of the contaminated water is too low for economic recovery, or if the metals are not useful for agriculture such as lead, chromium, mercury or the like, then a water insoluble form of humic acid can be used. Once the humic acid has been cross-linked and its solubility decreased, the metal ions are retained on the insolubilized humic acid. The cross-linked humic acid can be further insolubilized by immobilization on a carrier such as a gel.

To prepare the absorbent according to the present invention, humic acid is purified by acid precipitation followed by dissolution in distilled water at a pH of approximately 7. This dissolution and precipitation is repeated, after which the precipitated humic acid is washed with a suitable buffer and filtered through an appropriate filtration device.

Alternatively, the precipitated humic acid is washed by centrifugation and resuspension of solid humic acid. After washing, the material is dried overnight at temperatures from about 60–70° C. The dried material is then water-insolubilized, although it is still capable of adsorbing metals or organics. The water insoluble adsorbent can be rendered soluble by contact with monovalent metal ions.

In order to make humic acid insoluble at higher pH, the humic acid is cross-linked with conventional cross-linking agents such as aldehyde cross-linking agents, e.g., glutaraldehyde, or with at least one oxidoreductase enzyme.

The solubility of cross-linked humic acid can be lowered further and its handling properties improved by immobilization in a solid support such as a matrix or gel.

DETAILED DESCRIPTION OF THE INVENTION

Figure 1:
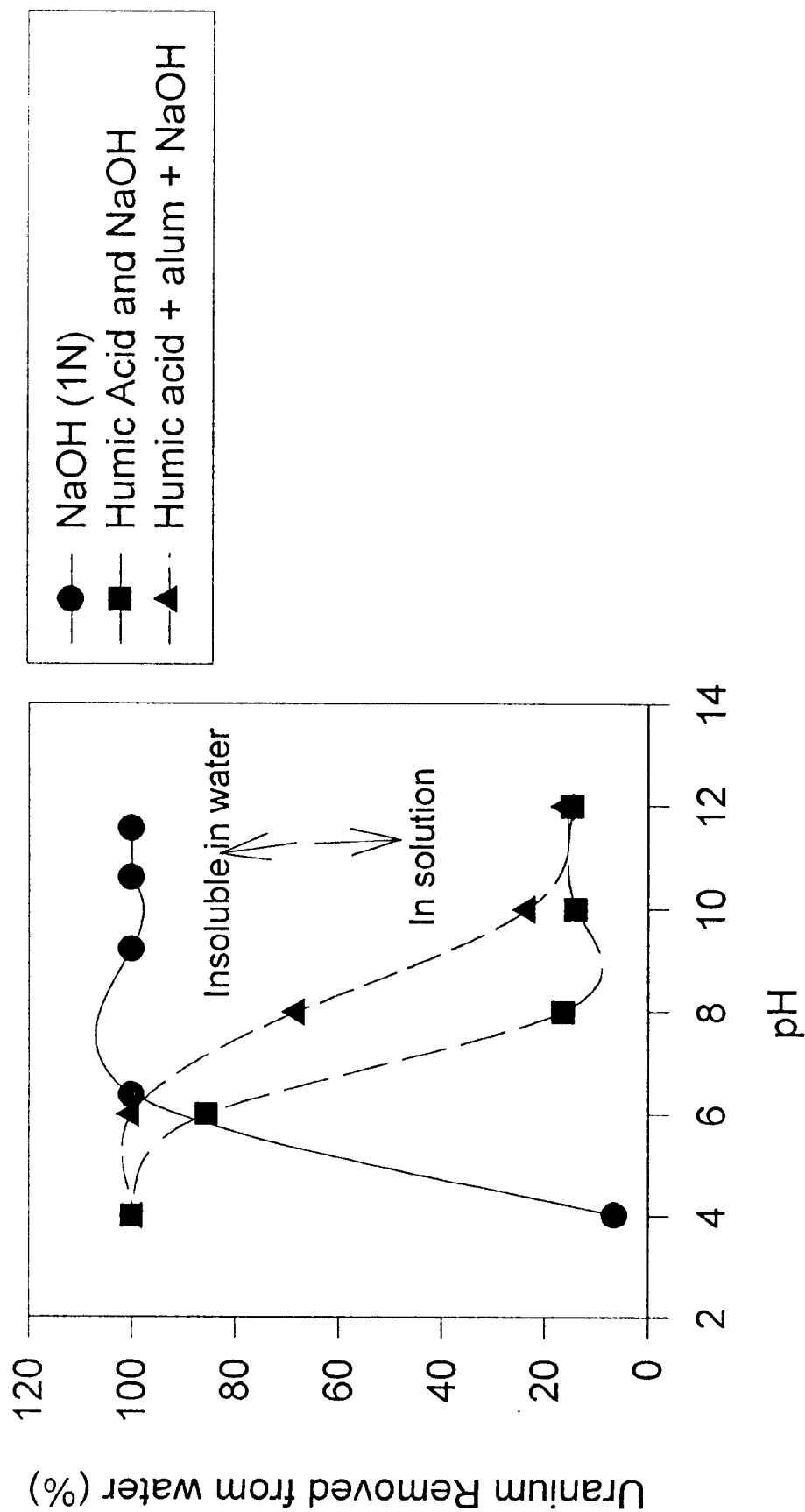
FIG. 1 shows the effect of pH on uranium removal using HUMASORB-L™ according to the present invention.

Several humic acid products are available from ARCTECH, Inc. under the trade name HUMASORB. Of these, HUMASORB-L™ is a liquid, whereas HUMASORB-S™ and HUMASORB-CS™ are solids. Humasorb-S™ dissolves in water at elevated pH under certain conditions, such as in the presence of monovalent species. HUMASORB-CS™ is a cross-linked derivative of HUMASORB-L™/HUMASORB-S™ designed to lower solubility of the humic acid at higher pH, while retaining the properties of contaminant removal.

The humic acid adsorbent of the present invention is useful in minimizing and reducing the volume of metal-, inorganic ion- and organic-contaminated water, wastewater, and soil. The insolubilized purified humic acids are particularly useful in treating all types of water because in one step they adsorb cations and anions as well as organic molecules, with no requirement for sludge dewatering. Of particular importance is that the insolubilized purified humic acid can be used to reduce metals present as anions to the cationic state for removal by chelation or ion exchange, e.g., Cr(VI) to Cr(III). Only one secondary waste stream is generated. That secondary waste stream, which is primarily composed of combustible organic materials, can be further reduced by thermal destruction technologies to achieve a volume reduction of 100 to less than 1.

Humic acid is a natural material with many properties which can be exploited for several cost effective applications. Humic substances are complex mixtures of naturally occurring organic materials. These substances are formed from the decay of plant and animal residues in the environment. Humic acid constitutes a significant portion of the acid radicals found in humic substances.

Humic acid is dark brown to black in color and is considered to be a complex aromatic macromolecule with various linkages between the aromatic groups. The different compounds involved in linkages include amino acids, amino sugars, peptides, aliphatic acids and other aliphatic compounds. The carboxylic, phenolic, aliphatic and enolic-hydroxyl and carbonyl are the various functional groups in humic acid. Humic acid is an association of molecules forming aggregates of elongated bundles of fibers at low pHs and open flexible structures perforated by voids at high pHs. The voids can trap and adsorb both organic and inorganic particles if the charges are complementary.

Humic acid has a large cation exchange capacity and holds both monovalent and multivalent elements very strongly. The molecular weight of humic acid ranges from about 800 daltons to about 500,000 daltons, with the weight average molecular weight being from about 5000 daltons to about 50,000 daltons. The cation exchange capacity of humic acid varies from about 200 to about 500 meq $CaCO_3$ per 100 grams at pH 7, depending upon the source of the humic acid.

Humic acid is a polyelectrolyte, and is believed to form complexes with clay particles. When the cation exchange sites on the humic acid molecule are filled predominantly with hydrogen ions, the material, which is considered to be an acid, is insoluble in water. However, when the predominant cations at the exchange sites are other than hydrogen, the material is called a humate. Humates of the monovalent alkali metals or ammonia are soluble in water, but the humates of most multivalent metals are insoluble.

The sorption of chemicals onto the surfaces of humic substances has been studied by a large number of environmental chemists. Sorption mechanisms are defined to include Van der Waals attractions, hydrophobic bonding, hydrogen bonding, charge transfer, ion exchange, and ligand exchange.

A major source of humic acid is coal—the most abundant and predominant product of plant residue coalification. All ranks of coal contain humic acid but lignites represent the most easily available and concentrated form of humic acid. Humic acid concentration of lignite varies from 30–90%, depending upon location. Peat, humates and sewage sludge also contain significant quantities of humic acid.

actosol® is manufactured by ARCTECH, Inc. of Chantilly, Va. as a soil amendment product. actosol® is a family of products based upon humic acid extracted from low rank coals, such as leonardite. HUMASORB™, derived from actosol®, has the ability to adsorb organic material, capture metal ions, and capture radionuclides and anions. Because of the distribution of its functional groups, humic acid has cation exchange sites needed for the chelation and removal and/or recovery of metals. The metal binding capacity of humic acid is a function of pH. In addition, humic acid readily removes organics from waste waters through a physical adsorption phenomenon in a fashion similar to that of activated carbon.

Humic acid was isolated and purified from actosol® by acidification using concentrated hydrochloric acid to lower the pH below about 2. The precipitated solids were purified by repeated washing with distilled water and acidification. A pressure filter (60 psig) was used to separate the precipitated humic acid from the other humic substances dissolved in water. The amount of humic acid recovered ranged from about 11.79% to about 14.79% by weight of actosol®.

Humic acid can be insolubilized by two different methods. In one method, multivalent metals are complexed or chelated to humic acid to insolubilize the humic acid. These can be metals such as iron, aluminum, copper, manganese, lead, cadmium, mercury, chromium or other multivalent metals. Although univalent metals such as potassium, sodium and the like usually produce soluble complexes or chelates, when the cation is the hydronium ion ($H^+$), the humic acid is insoluble in water.

The other method for producing insoluble humic acid is to polymerize or cross-link the humic acid. By cross-linking humic acid, a water-insoluble polymer is formed which lowers the solubility of the adsorbent as the pH is increased. The active groups of the humic acid are protected by calcium. The cross-linked humic acid has a low solubility in water after cross-linking at near neutral pH even in the presence of sodium ions.

Any conventional cross-linking agent can be used to cross-link the humic acid to produce an insoluble product, e.g., HUMASORB-CS™. Among the cross-linking agents that can be used to produce HUMASORB-CS™ are aldehydes and oxidoreductase enzymes. These products showed significantly lower solubility at higher pH, as shown in FIG. 1. For example, when glutaraldehyde or a mixture of glutaraldehyde and mineral acid (HCl, $HNO_3$, $H_2SO_4$, $H_3PO_4$, etc.) is used, the resulting cross-linked humic acid has a low solubility in water at near neutral pH i n the presence of sodium ions.

Among the aldehydes that can be used for cross-linking humic acid are aliphatic or aromatic aldehydes having from 1 to 22 carbon atoms. The aldehydes may be substituted with any substituent that does not adversely affect the cross-linking capabilities of the aldehydes. The aldehydes may be saturated or unsaturated. The aldehyde may be an aromatic aldehyde, such as benzaldehyde, tolualdehyde (o-, m-, or p-) or salicylaldehyde.

Any type of oxidoreductase enzyme can be used to cross-link the humic acid, including peroxidases and hydrogenases.

The cross-linking is effected by reacting the humic acid with the aldehyde or oxidoreductase enzymes such as peroxidase enzymes at room temperature or slightly above room temperature for a period of two to five hours.

Not only does HUMASORB-CS™ retain the metal sorption capacity of humic acid after cross-linking, the metal sorption capacity of humic acid is greatly increased by virtue of the cross-linking.

In order to lower the solubility of cross-linked humic acid even further, the cross-linked humic acid can be immobilized within a solid support, such as a gel or other matrix. Both soluble humic acid and insoluble (i.e., cross-linked) humic acid can be immobilized. Any type of inert gel/matrix or other insoluble material can be used to form a solid support for the humic acid adsorbent. Among the types of entrapment media which can be used are alginates, cross-linked dextran gels, agar, gellan, chitosan and curdlan. Other types of supports can be used to immobilize the humic acid adsorbent, including supports used for microorganisms in fermentation processes which are well known to those skilled in the art. Among these immobilizing supports are polystyrene beads, acrolein beads, and the like. The support, of course, does not enter into the adsorption process, but merely suspends the adsorbent in the liquid to aid the adsorbent's contacting the contaminants to be adsorbed.

Figure 10:
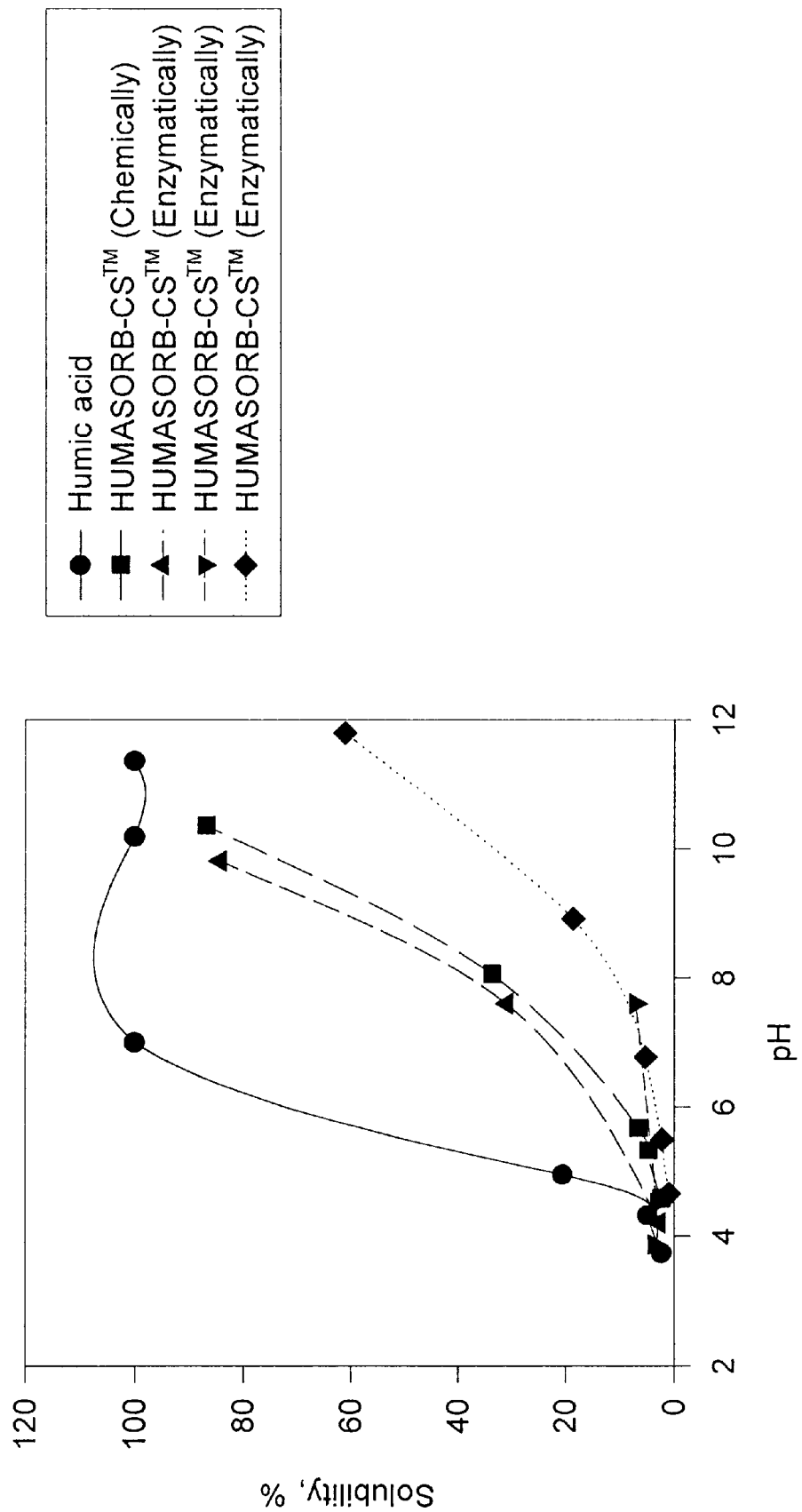
FIG. 10 shows solubility of cross-linked (both chemically and enzymatically) humic acid as compared with pure humic acid over a range of pH.
Figure 11:
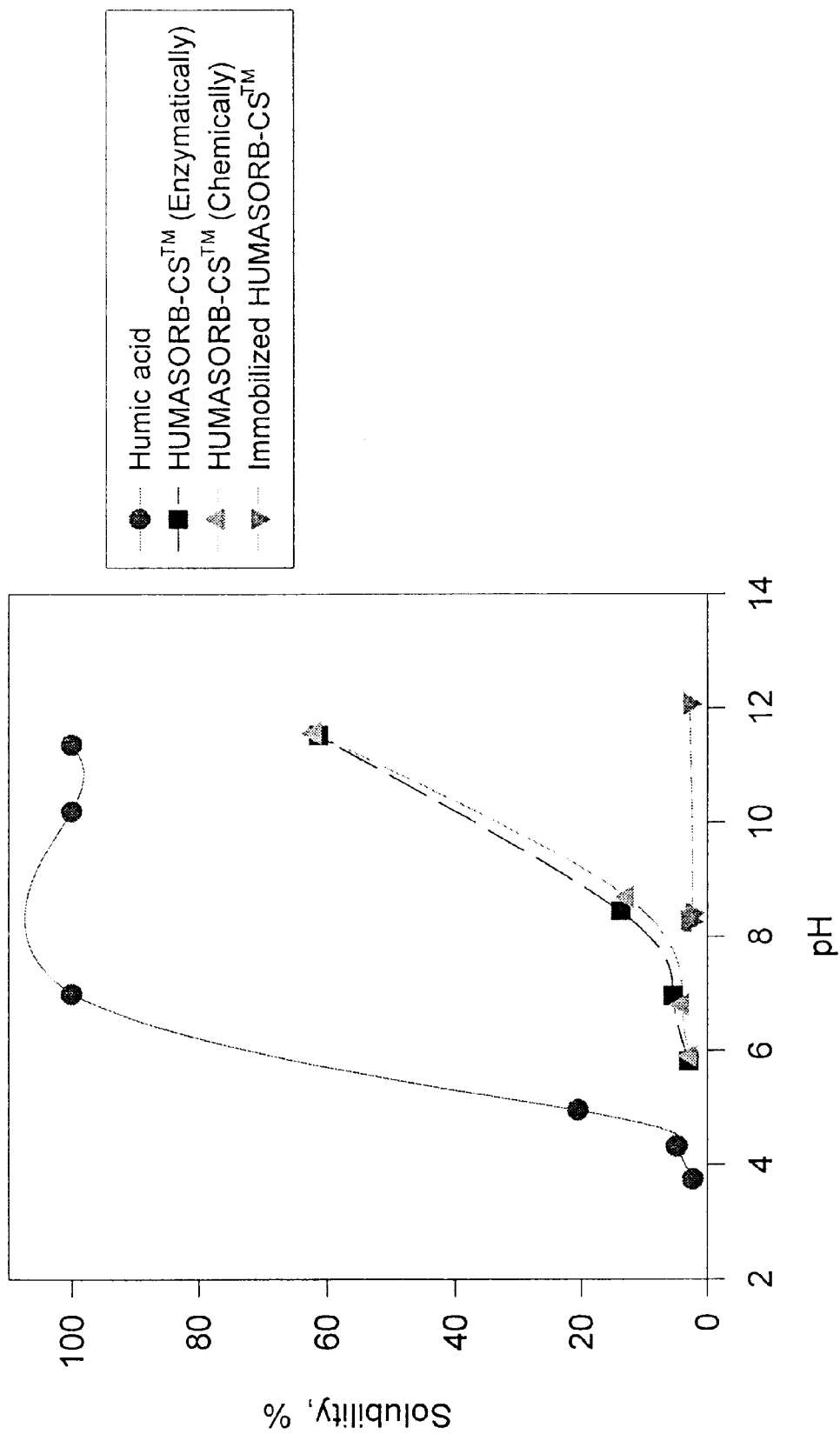
FIG. 11 shows that the solubility of cross-linked humic acid can be lowered by immobilizing the cross-linked humic acid.
Figure 12:
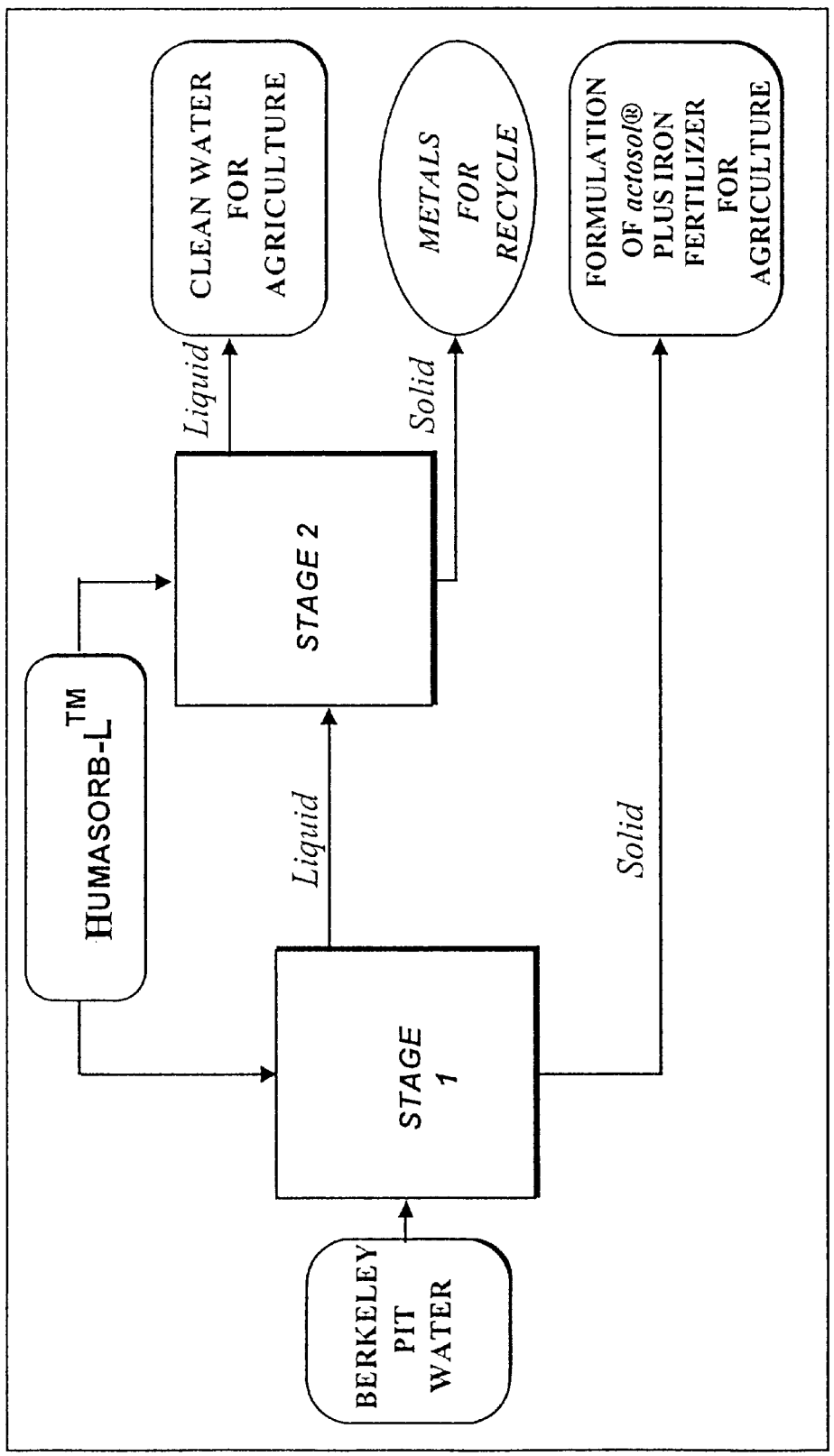
FIG. 12 is a flow chart of the process of the present invention for converting contaminated water to fertilizer and agriculturally useful water.

The preferred matrix for immobilizing any form, solid or liquid, of humic acid is a gel, such as calcium/alginate matrix/gel. The immobilization process produces beads of immobilized humic acid adsorbent encapsulated in a calcium/alginate matrix/gel which has a significantly lower solubility than the un-immobilized humic acid. When the immobilized HUMASORB™ is contacted with the contaminated water, the contaminated water diffuses through the matrix to contact the HUMASORB™. Although there may be some diffusion limitations, these are expected to be negligible. The immobilized product was found to be effective in removing $Cr^{+3}$ from simulated waste streams in both batch and column studies. The solubility characteristics of the immobilized product are compared with other forms of humic acid adsorbent in FIG. 10.

For treating water containing agriculturally desirable metals according to the present invention, soluble humic acid, such as HUMASORB-L™, is admixed with water. When the humic acid contacts the multivalent metals in solution, an ion exchange complexation reaction occurs, chelating the multivalent metals. The multivalent metal chelated complex is insoluble in water and coagulates, settling out as a floc.

The soluble humic acid, such as HUMASORB-L™, can be used to decontaminate soils and various structural materials and equipment. The decontamination is easily accomplished by rinsing the contaminated soil or equipment with HUMASORB-L™ and separating the spent HUMASORB-L™. Similarly, contaminated structural materials can be washed with HUMASORB-L™ to remove the contaminants. The spent HUMASORB-L™ from these operations can be further precipitated and separated for final disposal.

Soluble humic acid, such as HUMASORB-L™, can be used to recover desirable metals for use as fertilizers. A study was conducted to recover micronutrients and remove toxic metals such as cadmium using a two-step process based upon HUMASORB-L™. This study was conducted using contaminated water from a Superfund Site, which was representative of acidic water with large quantities of heavy metals dissolved therein. As part of this study, micronutrients recovered from the contaminated water were used in a fertilizer composition marketed as actosol® by ARCTECH, Inc.

EXAMPLE 1

In the study to remove heavy metals such as cadmium from contaminated water, an actual field waste stream was treated. Using the adsorbent according to the present invention HUMASORB™, nearly 98% of the copper and iron in the contaminated water was captured for use as fertilizer micronutrients, and significant percentages of other micronutrients such as zinc, manganese, and magnesium were captured as well. Toxic heavy metals such as cadmium and arsenic were removed to levels below the detection limit of standard laboratory tests before the water was discharged. Table 1 shows a comparison of the metals present in the contaminated water before and after the treatment was conducted:

TABLE 1

| Metals | Raw Water (ppm) | Treated Water (ppm) |
|---|---|---|
| Aluminum | 255 | 7.87-B |
| Arsenic | 0.513 | 0.151-U |
| Cadmium | 1.99 | 0.0715-B |
| Copper | 198 | 0.287-B |
| Iron | 982 | 0.602-B |
| Magnesium | 417 | 271 |
| Manganese | 195 | 52.4 |

TABLE 1-continued

| Metals | Raw Water (ppm) | Treated Water (ppm) |
|---|---|---|
| Potassium | 9.21-B | 3990 |
| Zinc | 555 | 48.1 |

B: Below method detection limit
U: Undetected

Figure 2:
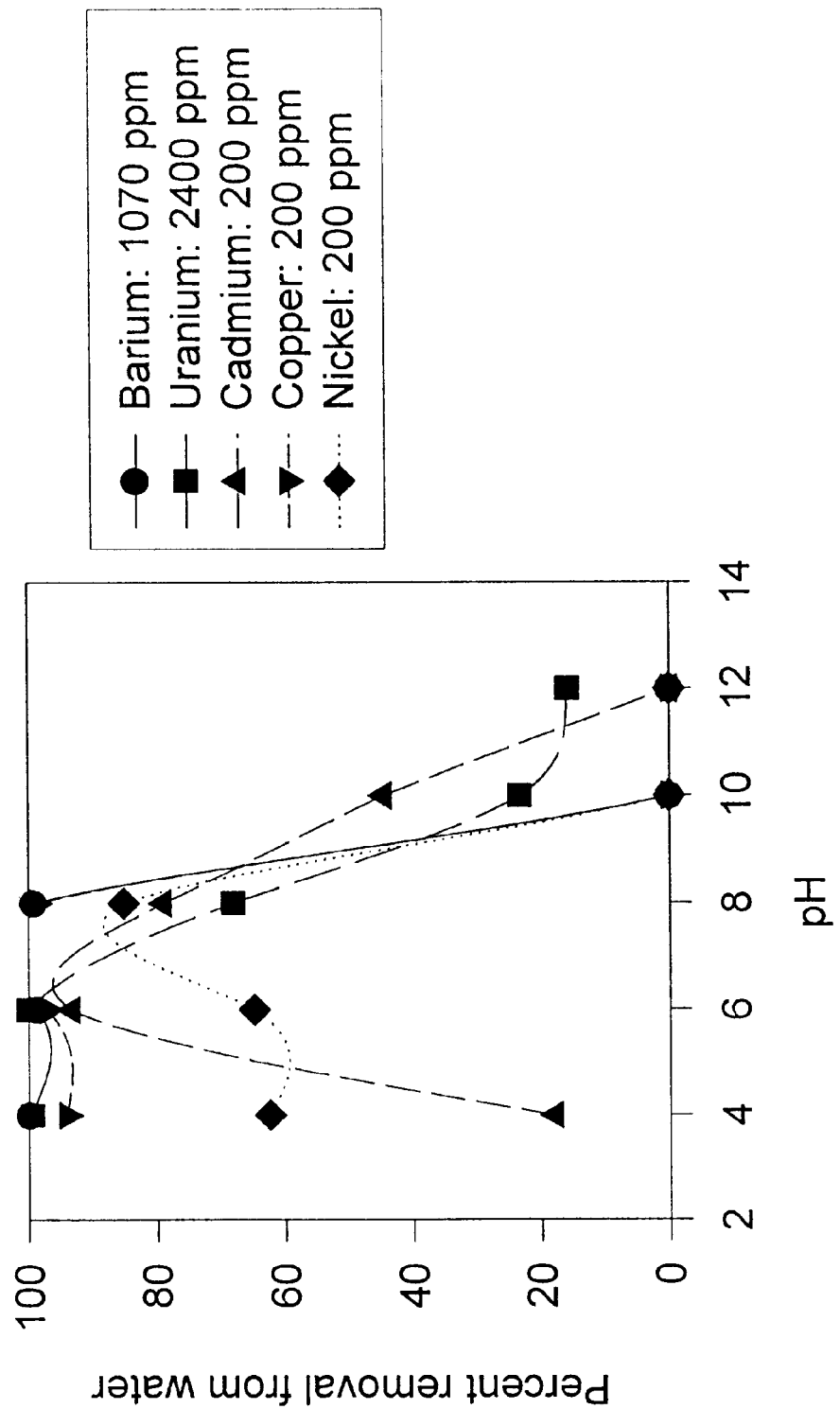
FIG. 2 shows the effect of pH on removal of various metals using HUMASORB-L™ according to the present invention.

As shown in Table 1, aluminum, arsenic, cadmium, copper and iron were either undetected or below the method detection limit. The increase in the concentration of potassium in the treated water is believed to be due to the exchanges of metals in the contaminated water with potassium present in HUMASORB-L™. This treatability study demonstrated that adsorbent of the present invention is useful for treatment and resource recovery of acidic, heavy metal laden waters. The soluble humic acid product of the present invention can be used to tie up contaminants in the water, such as heavy metals. FIGS. 1 and 2 show the use of HUMASORB-L™ to remove barium, uranium, cadmium, copper and nickel from water.

For treating waters that do not contain sufficient amounts of agriculturally desirable metals to make it economically feasible to attempt recovery of such metals, or if the water contains undesirable metals or organic contamination, or both, insoluble cross-linked humic acid is used and the contaminated water is passed through a column of the adsorbent of the present invention to remove the undesired contaminants.

For treating waters containing agriculturally desirable metals, the HUMASORB-L™ is mixed with the metal containing water. When the humic acid contacts the metals in solution, an ion exchange/complexation reaction occurs. Insoluble humates are formed which are then recovered as chelated micronutrients by sedimentation followed by filtration. The amount of HUMASORB-L™ to use will vary depending on the concentration of desirable metals in the contaminated water, and must be determined by experimentation. The amount of HUMASORB-L™ to be used can readily be determined by one skilled in the art without undue experimentation. The adsorbent of the present invention treats organics, metal ions and anions in a single process step. When the adsorbent is used to treat waters containing agriculturally useful metals or micronutrients, the products of the treatment are marketable as a soil amendment product. When the adsorbent of the present invention is compared to carbon adsorption and ion exchange resins in terms of performance and cost savings, the adsorbent of the present invention is the method of choice.

For treating waters that do not contain sufficient amounts of agriculturally desirable metals, or if the water contains undesirable metals or organic contamination, insoluble (i.e., cross-linked) humic acid (e.g., HUMASORB-CS™) is used and the contaminated water is passed through a column of the insoluble adsorbent.

The adsorbent of the present invention is useful in removing metal ions such as $Fe^{3+}$, $Al^{3+}$. $Cr^{3+}$, $Pb^{2+}$, $Cu^{2+}$, $Zn^{2+}$, $Co^{2+}$, $Hg^+$, $Cd^{2+}$, $Ni^{2+}$, and $Mn^{2+}$, either singly or together. Because the adsorbent of the present invention also adsorbs organics and removes metals present as anions as well as cations, no separate treatment with activated carbon or with an anion exchange resin is required to remove all contaminants from the material treated.

Precipitates formed between metal ions and the adsorbent of the present invention are compact and noncolloidal. The volume of their sludge is sharply reduced in comparison to that of finely dispersed calcium oxide precipitates, which have conventionally been used for treating waste streams. Therefore, it is easy to remove the precipitates formed by adsorbents of the present invention by simple filtration or settling. If it is desired to recover the metal values sequestered in the adsorbent, it is possible to elute these metal values from the precipitates with an appropriate acid. This is not possible with conventional calcium oxide precipitation of heavy metals.

The humic acid based adsorbent of the present invention may be used in either soluble or insoluble form, either alone or in admixture with other forms of humic acid according to the present invention. Anions such as nitrate or nitrite or similar anions are weakly adsorbed due to the charged nature of the humic acid molecule and the multitude of active (charged) sites. Although adsorption according to the present invention is not governed by any one theory, it is believed that organic molecules are adsorbed because of the oleophilic nature of the humic acid molecule. In other words, it is believed that the organic molecules adsorbed partition onto the "organic like" surface of the humic acid molecule.

EXAMPLE 2

Water contaminated with benzene was treated with soluble humic acid (HUMASORB-L™) in a 125 ml serum vial with a ratio of 4.16676 ml actosol® per ml of spiked water (i.e., approximately 1 gram of humic acid per mg of benzene). The benzene-contaminated water was contacted with HUMASORB-L™ was at room temperature for approximately two hours. After two hours, the benzene was completely removed from the water. The benzene- containing HUMASORB-L™ separated from the water by coagulation with alum followed by filtration.

Metal Sorption

The effect of pH on the sorption of metals by HUMASORB-L™ was evaluated by adjusting the pH with sodium hydroxide (1.0N) or concentrated hydrochloric acid (1.0N). In polypropylene centrifuge bottles, HUMASORB-L™ was contacted with spiked water solution containing known concentrations of metals. The spiked solutions were prepared by dissolving the metal salts in water. The centrifuge bottles were shaken at 300 rpm and 25° C. for the desired contact time. After the desired contact time, 10% alum solution was added to the centrifuge bottles to coagulate humic acid. The bottles were then centrifuged at 2000 rpm for 30 minutes to separate the solid and liquid phases. The supernatant in the bottles was analyzed for the target metal.

The desired contact time for all of these processes is the time needed to obtain equilibrium conditions. It has been determined that for metals, this time is approximately two to three hours, and for organics, the time to reach equilibrium is about 24 hours.

The adsorption capacity of purified humic acid was evaluated by developing metal sorption isotherms. The spiked water solution was contacted with different amounts of humic acid in centrifuge bottles. The pH was not adjusted in these tests. The centrifuge bottles were shaken at 300 rpm and 25° C. for two hours. After the desired contact time, the bottles were centrifuged at 2000 rpm for 30 minutes to separate the solid and liquid phases. The ability of humic acid to reduce toxic metals such as Cr (VI), present as anions $(Cr_2O_7)^{-2}$, to less toxic Cr(III) was also evaluated in a similar manner.

EXAMPLE 3

HUMASORB™ was immobilized further to reduce solubility and improve handling properties. The different forms of HUMASORB™ were immobilized in calcium-alginate matrix/gel. The adsorbents were immobilized both in the presence and absence of glutaraldehyde, a cross-linking agent. Immobilized HUMASORB™ was then evaluated for removal of chromium, a representative target contaminant from simulated waste streams.

In this study, the initial chromium concentration was 200 ppm. The simulated waste stream was contacted with the adsorbent for two hours at 25° C. and 300 rpm. The adsorbent loading was 0.5 grams in 25 ml contaminated water. All of the adsorbents tested were immobilized in calcium-alginate matrix/gel. The results of this study and the pH are shown in Tables 2 and 3.

TABLE 2

Chromium Removal Using Immobilized HUMASORB ™

| Adsorbent[++] | Percent Removal | pH |
|---|---|---|
| HUMASORB-L ™ | 81.06 | 5.07 |
| HUMASORB-L ™ | 82.37 | 5.22 |
| HUMASORB-L ™/Glu** | 60.69 | 4.51 |
| HUMASORB-L ™/Glu** | 66.24 | 4.54 |
| HUMASORB-S ™ | 30.20 | 2.89 |
| HUMASORB-S ™ | 12.24 | 2.87 |
| HUMASORB-S ™/Glu** | 49.14 | 2.95 |
| HUMASORB-S ™/Glu** | 37.49 | 2.95 |
| Calcium-alginate (control) | 49.20 | 3.95 |
| Calcium-alginate (control) | 41.63 | 3.99 |

[++]All adsorbents immobilized in calcium-alginate matrix/gel
**Glutaraldehyde
Reaction conditions:
Initial chromium concentration: 200 ppm
Contact time: 2 hrs at 25° C. and 300 rpm
Adsorbent loading: 0.5 grams in 25 ml contaminated water.

TABLE 3

Chromium Removal Using Immobilized HUMASORB ™ Over Time

| Time (Hours) | Percent Removal |
|---|---|
| 2 | 89.01 |
| 4 | 97.39 |
| 8 | 97.61 |
| 16 | 100 |

Reaction Conditions:
Initial chromium concentration: 200 ppm
Contacted at 25° C. and 300 rpm; pH: 5–5.5
Adsorbent: HUMASORB-L ™/Glutaraldehyde (Immobilized in calcium-alginate matrix/gel)
Adsorbent loading: 0.5 grams in 25 ml contaminated water Several of the adsorbents were used in additional experiments conducted in succinate buffer to keep the pH relatively constant and to demonstrate that the differences in pH were not primarily responsible for increased chromium removal with immobilized HUMASORB™. In addition, silica gel, a relatively inert material, was also immobilized, using calcium-alginate matrix/gel for comparison. In the first study, the results of which are shown in Table 4, the adsorbent loading was 0.5 grams of adsorbent in 25 ml contaminated water. The contact time was two hours at 25° C. and 300 rpm. In the second study, the results of which are shown in Table 5, the adsorbent loading was 0.5 grams in 25 ml contaminated water, and the contact time was twelve hours at 25° C. and 300 rpm.

TABLE 4

Chromium Removal Using Immobilized HUMASORB ™
(in Succinate Buffer)

| Adsorbent | Initial pH | Final pH | Chromium Concentration (ppm) | Percent Removal |
|---|---|---|---|---|
| Control (chromium solution) | 5.0 | 4.87 | 196.58 | — |
| Calcium alginate beads | 5.0 | 4.96 | 183.04 | 6.89 |
| Silica gel/Ca-alginate | 5.0 | 5.03 | 178.11 | 9.40 |
| HUMASORB-S ™/Ca-alginate | 5.0 | 4.72 | 164.32 | 16.41 |
| HUMASORB-L ™/Glu/Ca-alginate | 5.0 | 5.30 | 157.47 | 19.90 |

Reaction Conditions:
Adsorbent loading: 0.5 grams in 25 ml contaminated water
Contact time: Two hours at 25° C. and 300 ppm (in succinate buffer)

TABLE 5

Chromium Removal Using Immobilized HUMASORB ™
(Longer Contact Time) (In succinate buffer)

| Adsorbent | Initial pH | Final pH | Chromium Concentration (ppm) | Percent Removal |
|---|---|---|---|---|
| Control (chromium solution) | 5.26 | 5.31 | 197.25 | — |
| Calcium alginate beads | 5.16 | 5.06 | 158.0 | 19.90 |
| Silica gel/Ca-alginate | 5.15 | 5.08 | 174.9 | 11.33 |
| HUMASORB-L ™/Glu/Ca-alginate | 5.23 | 5.84 | 115.6 | 41.39 |

Reaction Conditions:
Adsorbent loading: 0.5 grams in 25 ml contaminated water
Contact time: 12 hours at 25° C. and 300 rpm (in succinate buffer)

The results of these experiments shown in Tables 4 and 5 clearly indicate that immobilized HUMASORB™ is more effective than the calcium-alginate beads (control), and silica gel immobilized using calcium-alginate beads. The lower removal of chromium in succinate buffer is believed to be due to sodium in the succinate buffer competing for sites in the adsorbent.

Organic Adsorption

Isotherms for adsorption of chlorinated and petroleum hydrocarbons were developed using HUMASORB-S™. Initial experiments were conducted using HUMASORB-L™. The chlorinated hydrocarbons used were trichloroethylene (TCE) and tetrachloroethylene (PCE); benzene was the representative petroleum hydrocarbon used in this study.

Isotherms were developed by contacting spiked water samples with different amounts of humic acid in a 20 ml serum vial. HUMASORB™ was ground to less than 325 mesh when used in solid form in the experiments. The spiked water solution and the HUMASORB™ were contacted in crimp-sealed vials at 350 rpm and 251 for the desired time. The vials were centrifuged at 2000 rpm for 30 minutes after the contact time to separate the liquid and solid phases. The liquid phase was analyzed by using purge and trap GC- MS. The experimental procedure was similar for all forms of HUMASORB™, liquid or solid.

Metal Sorption

The effect of pH on uranium removal using HUMASORB-L™ humic acid is shown in FIG. 1. Clearly, the results indicate that HUMASORB-L™ is very effective removing uranium from water under acidic conditions. Uranium is soluble in water under acidic conditions, and increasing the pH to 4 using NaOH results in only 6% removal of uranium. Uranium is completely removed from the solution at pHs greater than 6.

However, at pH 4, the addition of HUMASORB-L™ removed all of the uranium from solution and the uranium was recovered as a solid bound to humic acid. The recovery of uranium decreased at higher pH in the presence of humic acid. The observed decrease in uranium recovery at higher pH in the presence of humic acid is expected, as humic acid dissolves in water at higher pH levels. The comparison of uranium recovery both in the absence and presence of HUMASORB-L™ indicates that uranium is bound to humic acid over the pH range of 2–12 and remains in solution under basic conditions in the presence of humic acid. The addition of a coagulant such as alum did not have a significant effect at higher pH. However, at near neutral pH(6–8), the addition of alum increased the amount of uranium recovery from water. The effect of pH on the removal of different metals using HUMASORB-L™ is shown in FIG. 2.

Figure 3A:
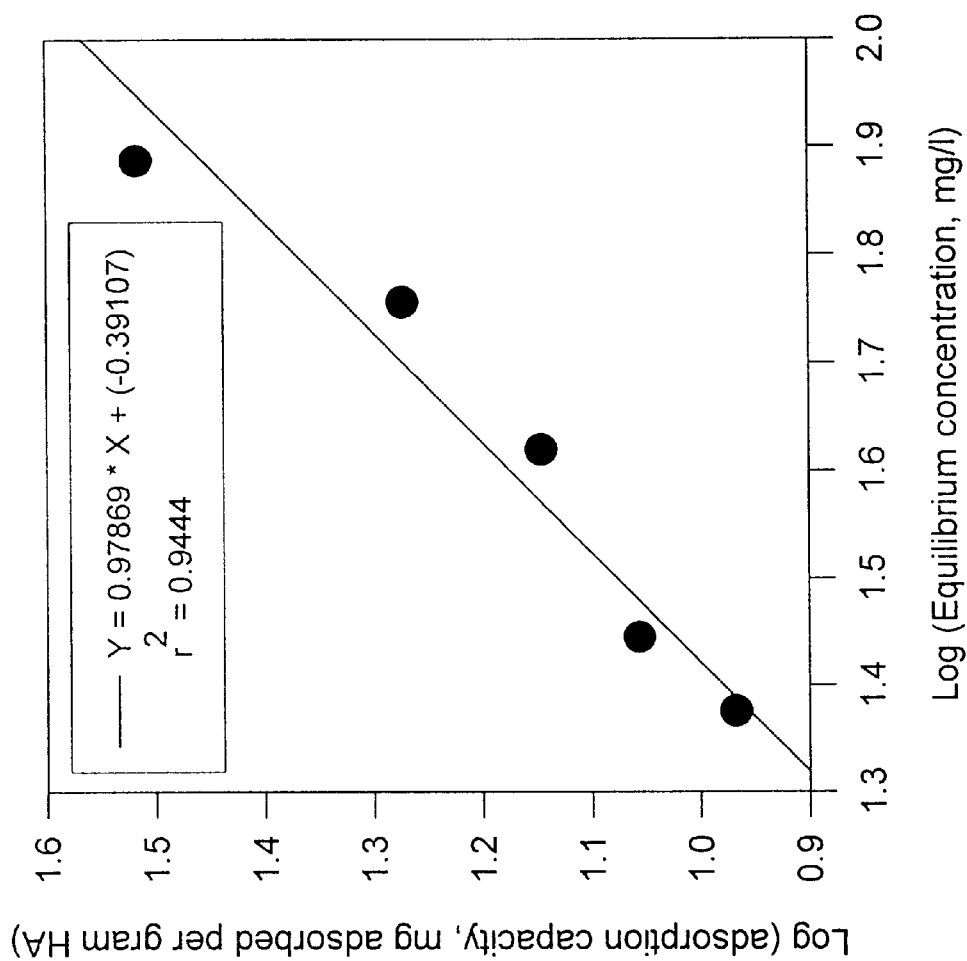
FIG. 3(A) shows the Freundlich plot for copper sorption by HUMASORB-S™ according to the present invention.
Figure 3B:
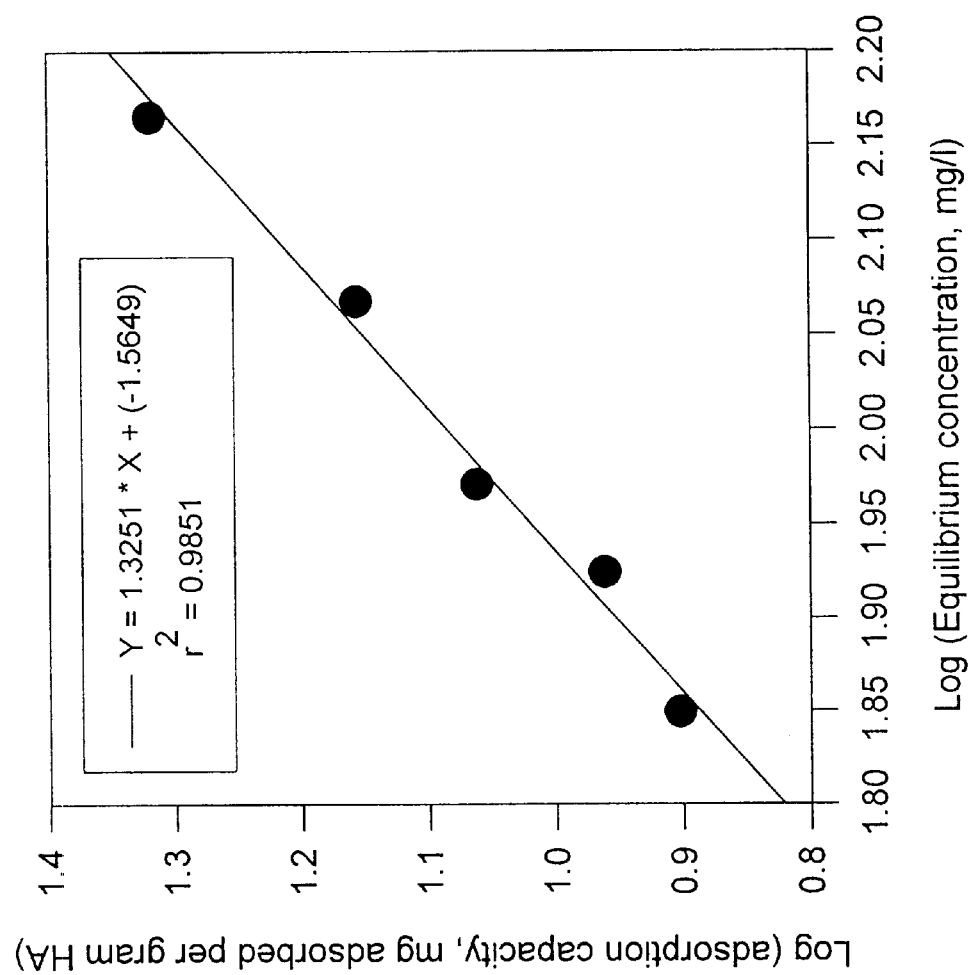
FIG. 3(B) shows the Freundlich plot for nickel sorption by HUMASORB-S™ according to the present invention.
Figure 4A:
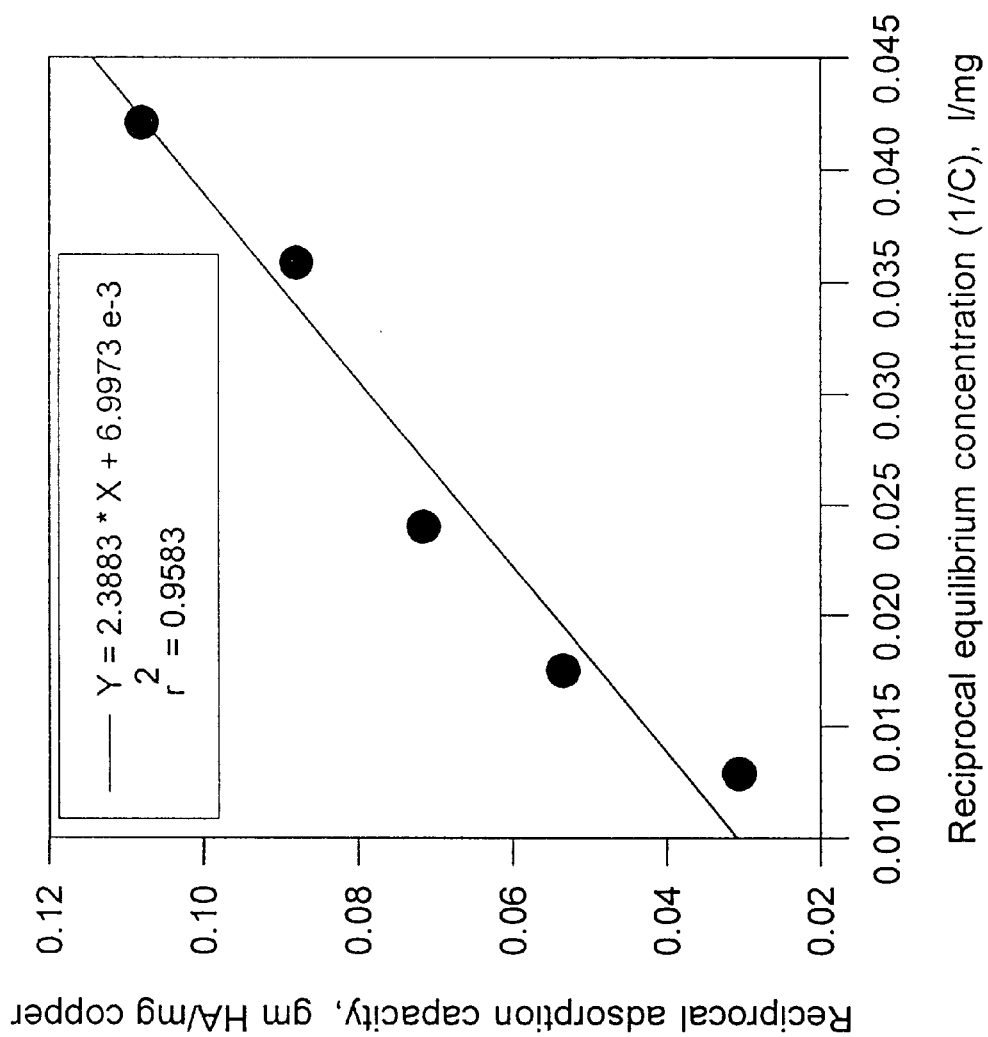
FIG. 4(A) shows the Langmuir plot for copper adsorption by HUMASORB-S™ according to the present invention.
Figure 4B:
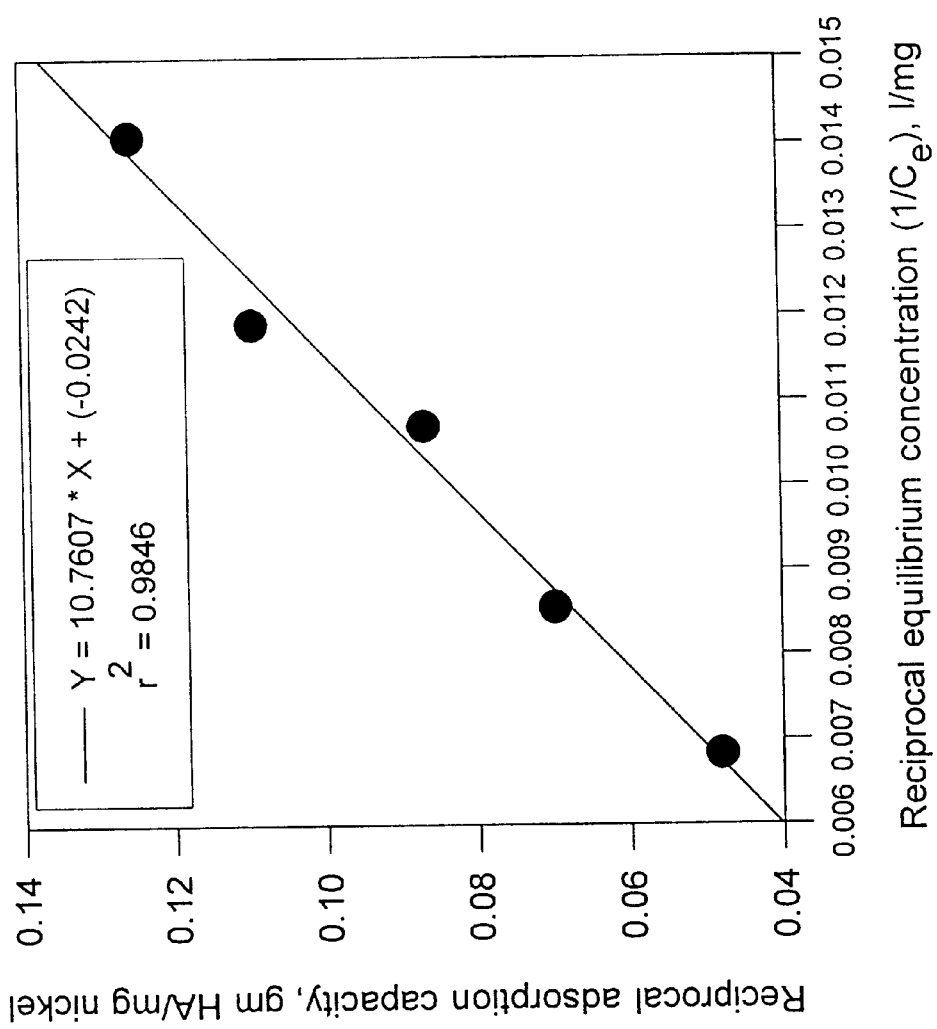
FIG. 4(B) shows the Langmuir plot for nickel adsorption by HUMASORB-S™ according to the present invention.

The sorption of copper and nickel by purified humic acid (HUMASORB-S™) was represented well by both the Freundlich and Langmuir models (FIGS. 3 and 4). The Langmuir model for nickel, however, gave negative values for the constants. However, the sorption of cadmium did not follow either the Freundlich or the Langmuir model indicating a complex multilayer sorption.

Figure 5:
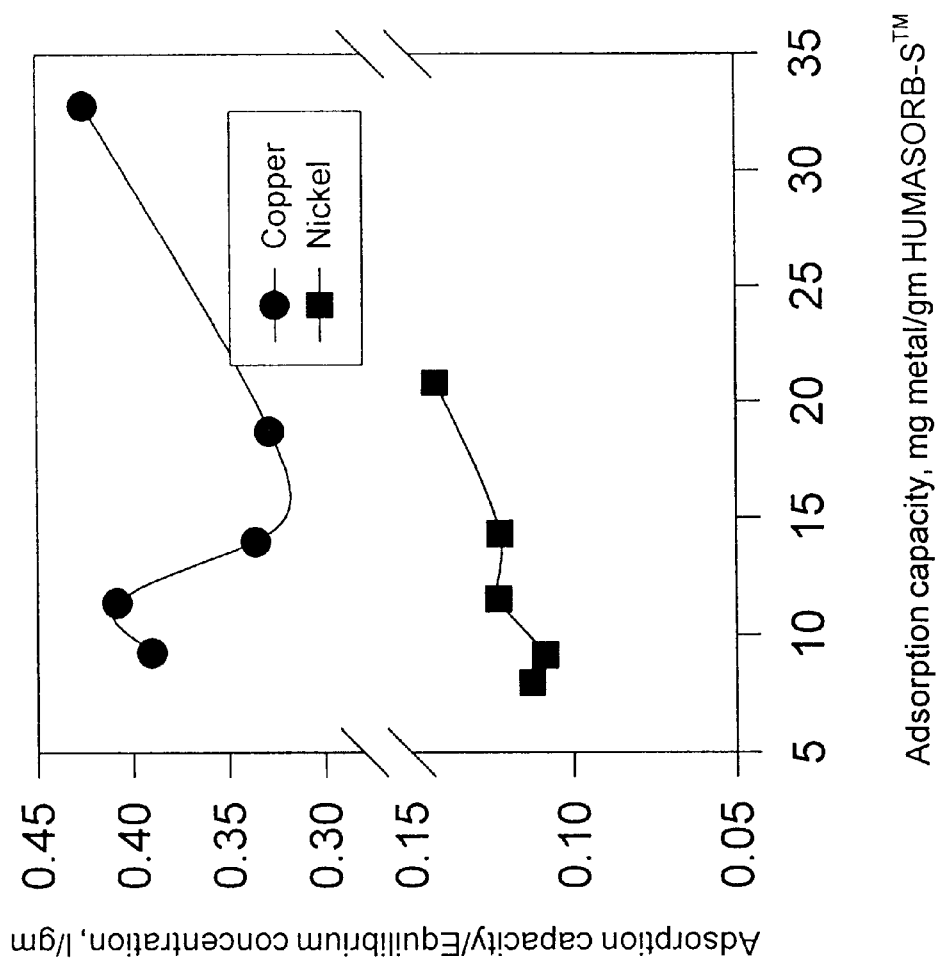
FIG. 5 shows the Scatchard plot for copper and nickel metal sorption on HUMASORB-S™ according to the present invention.

The metal sorption data were also analyzed using the method developed by Scathard in *Ann. New York Acad. Sci.* 51:660–672 (1949). The presence or more than one inflection point on a plot based on Scatchard analysis usually indicates the presence of more than one type of binding site. The Scatchard plot for the sorption of different metals by humic acid is shown in FIG. 5. The plot clearly indicates the presence of more than one type of binding site for copper and nickel sorption. The plot was, however, linear for cadmium, indicating that possibly only one type of binding site was active for cadmium sorption.

Humic acid can act as a reducing agent and influence oxidation-reduction of metal species. An unchelatable toxic oxo-anion such as chromium present as dichromate $(Cr_2O_7)^{-2}$ is reduced to relatively non-toxic Cr(III). The reduced chromium is then stabilized through chelation by humic acid. The reduction of different metal species such as mercury, vanadium, ion and plutonium by humic acid has been reported by a number of investigators (Alberts, J. J. et al., *Science* 184:895, 1974; Szalay, A. et al., *Geochim. Cosmochim Acta.* 1:31, 1967; Theis, T. L. et al., *Trace Met. Met-Org. Interact. Nat. Waters.* [Symp.], 273, 1976; Bondiette, E. A. *Transuranium Nuclides Environ.*, Proc. Symp. 273, 1976).

Figure 6:
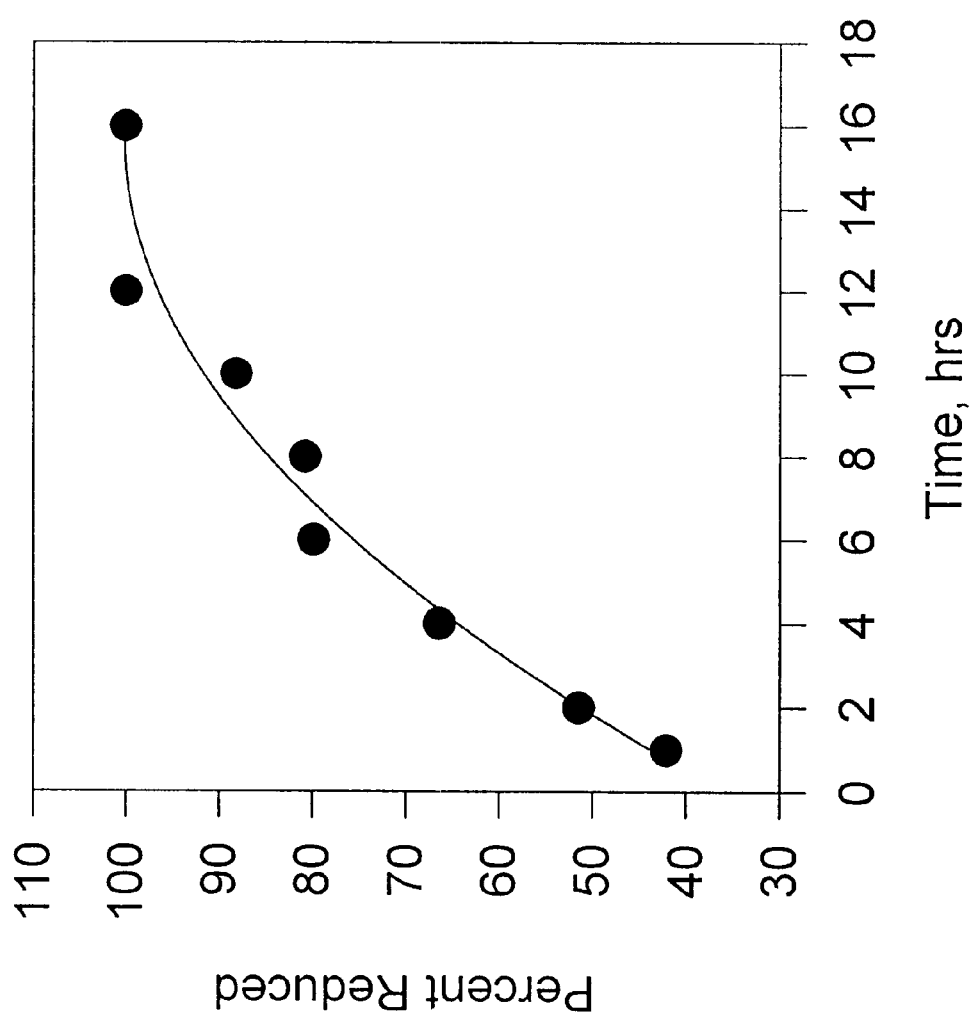
FIG. 6 shows reduction of chromium (VI) by HUMASORB-S™ according to the present invention.

The purified soluble humic acid (HUMASORB-S™) used in the present study was able to reduce Cr(VI) completely as shown in FIG. 6.

Figure 13:
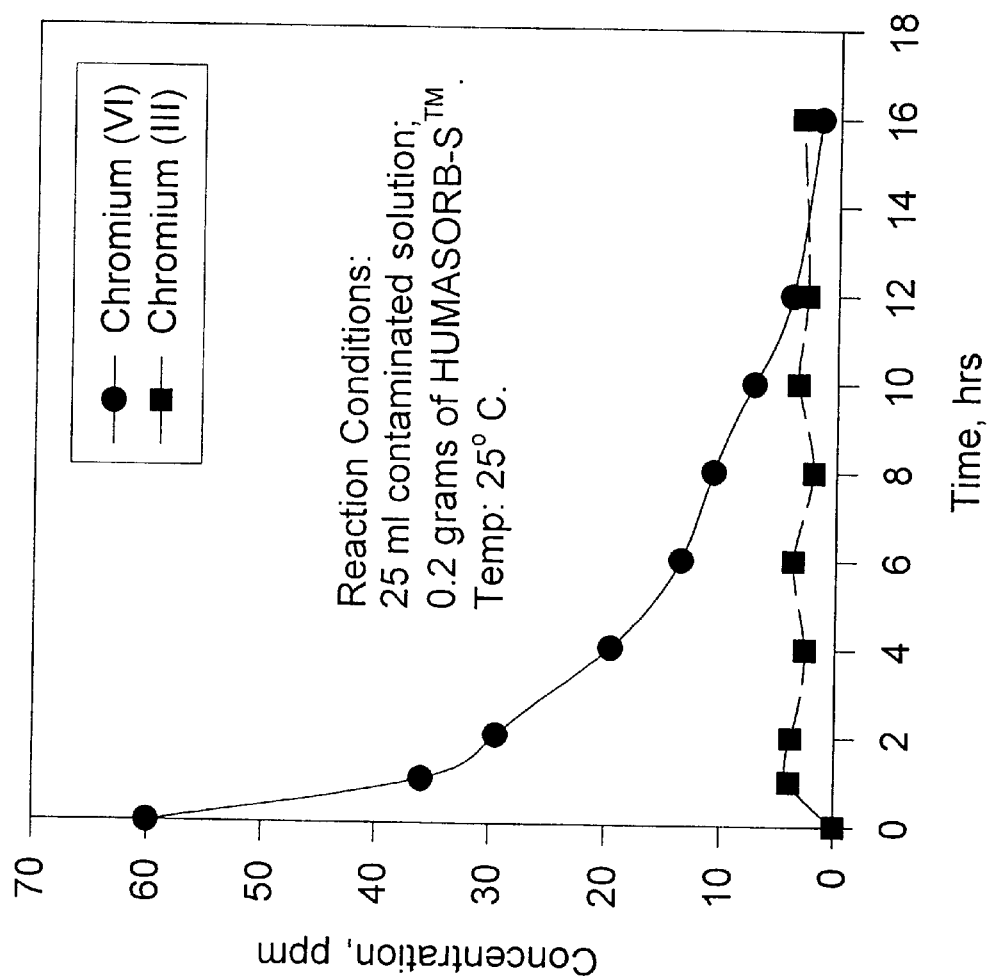
FIG. 13 illustrates how HUMASORB-S™ reduces chromium (VI) to chromium (III) and removes chromium from solution.

FIG. 13 shows the concentration of both Cr(VI) and Cr(III) during treating water containing Cr(VI) with HUMASORB-S™. FIG. 13 clearly shows that the total chromium concentration decreases during the reaction, indicating that Cr(VI) is reduced and the resulting Cr(III) is removed immediately. The removal of Cr(III) is believed to be by a combination of ion-exchange and complexation.

Figure 7A:
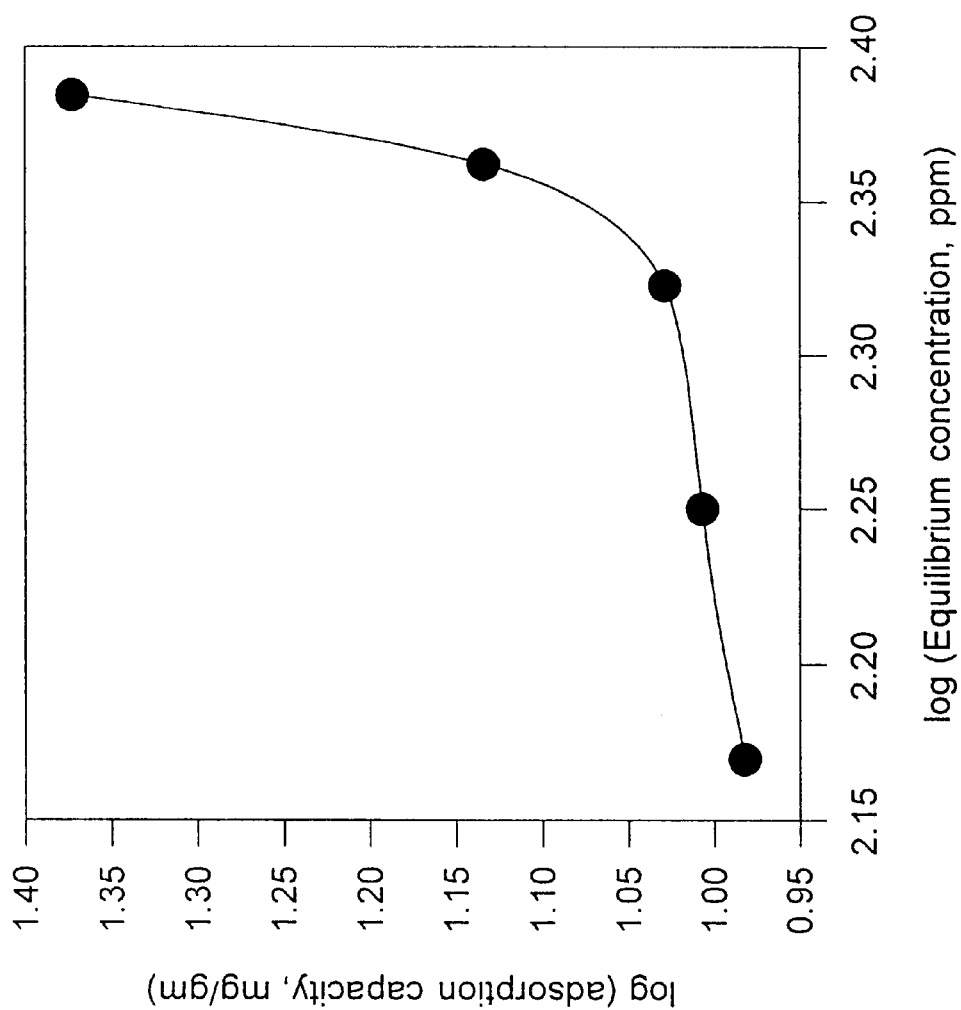
FIG. 7(A) shows the Freundlich isotherm for TCE adsorption on HUMASORB-S™ according to the present invention.
Figure 7B:
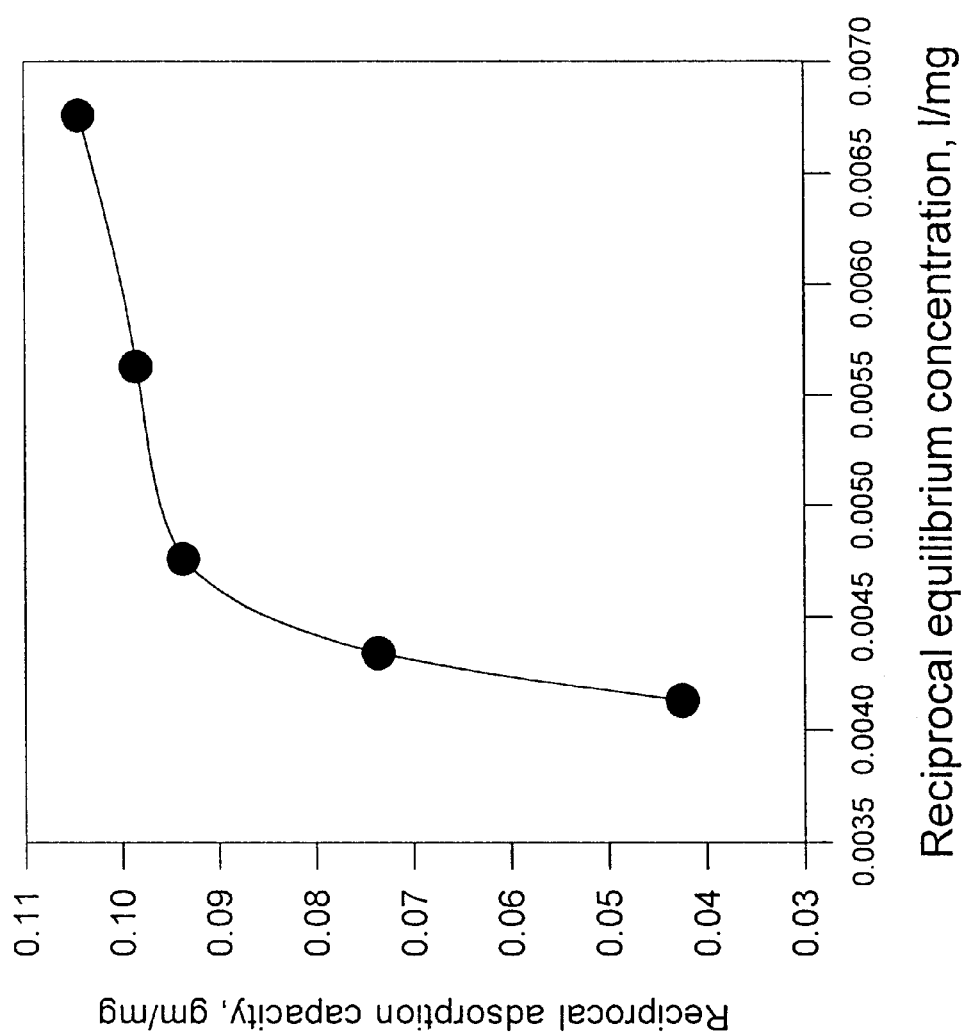
FIG. 7(B) shows the Langmuir isotherm for TCE adsorption on HUMASORB-S™ according to the present invention.

Freundlich and Langmuir adsorption models used to represent the data obtained for adsorption of organic compounds. The data for TCE adsorption was not represented by either model (FIG. 7). The isotherms show two distinctive phases with adsorption capacity increasing only slightly with concentrations up to 210 ppm and increasing rapidly above 210 ppm. The shape of the isotherm indicates the possibility of multi-layer adsorption, with adsorption capacity increasing rapidly at higher concentration.

Figure 8A:
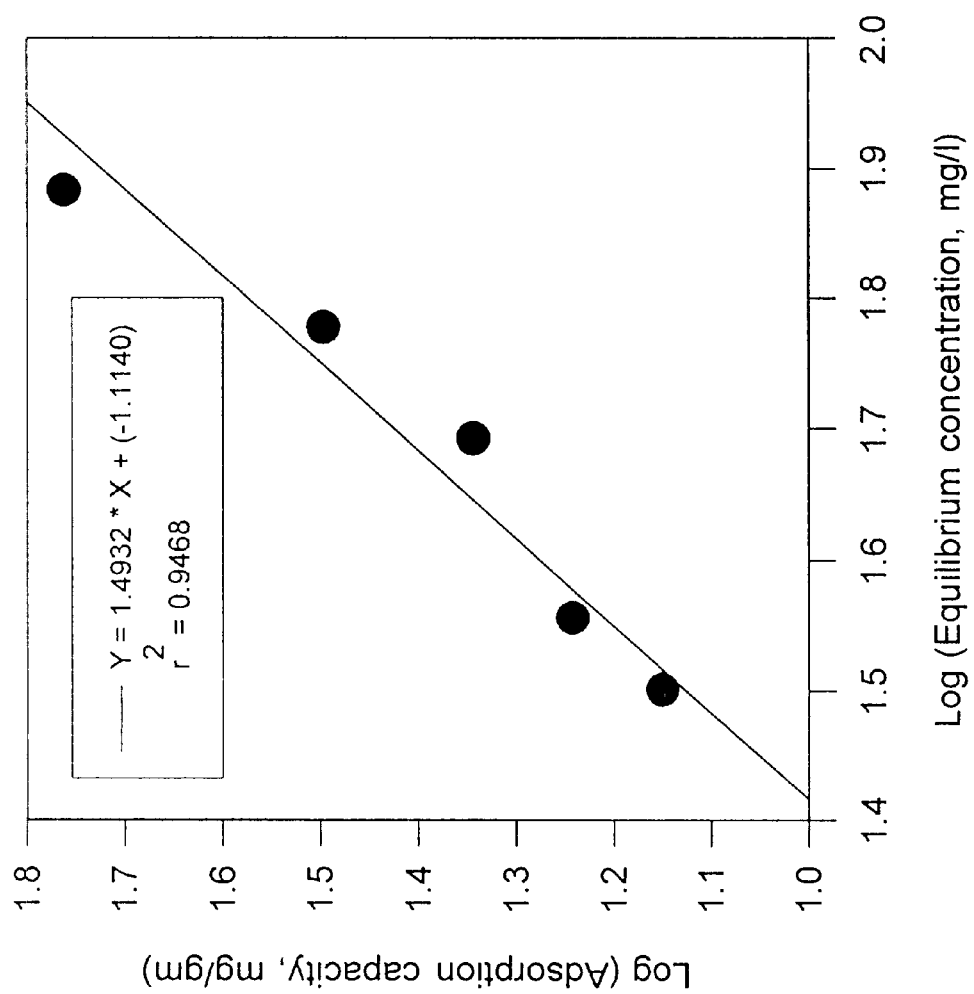
FIG. 8(A) shows the Freundlich isotherm for PCE adsorption on HUMASORB-S™ according to the present invention.
Figure 8B:
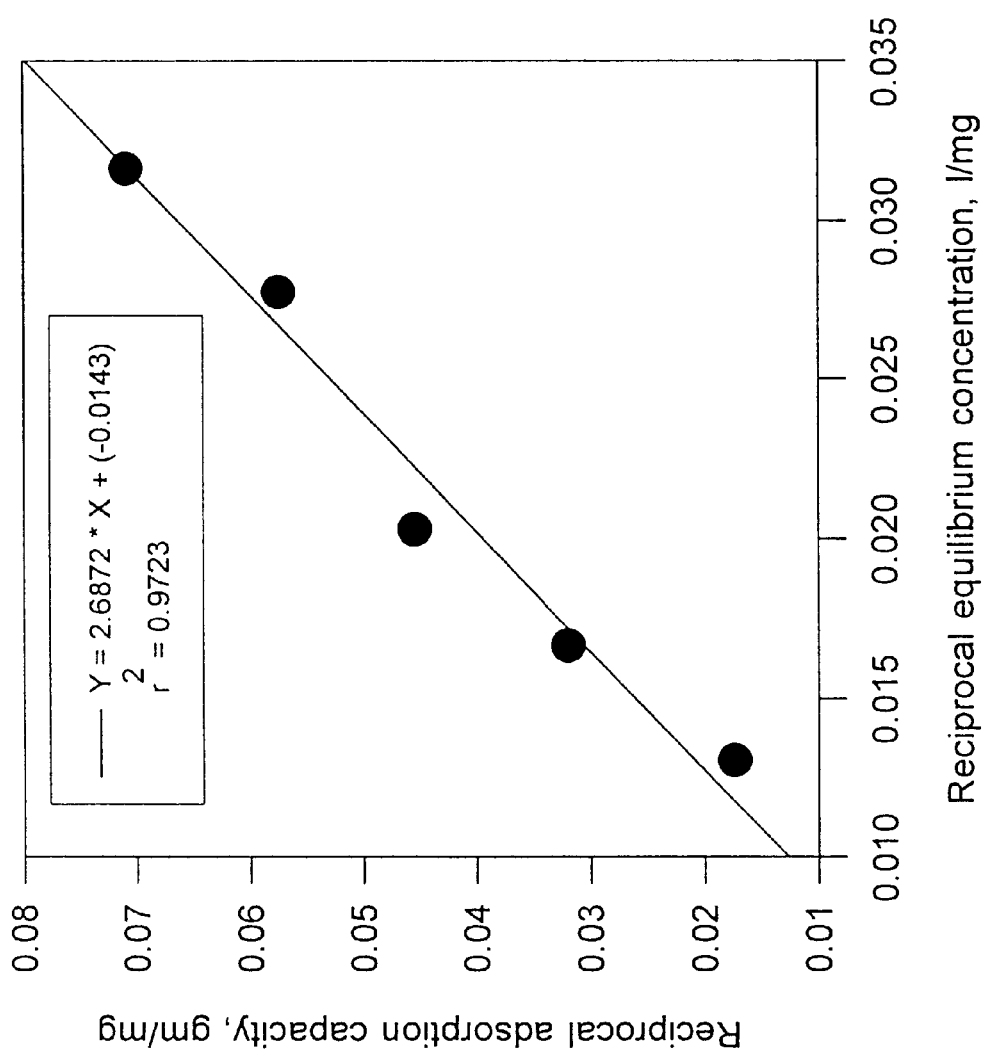
FIG. 8(B) shows the Langmuir isotherm for PCE adsorption on HUMASORB-S™ according to the present invention.

The adsorption of PCE on HUMASORB-S™ was also represented well by both Freundlich and Langmuir models as shown in FIG. 8. However, the Langmuir model gave negative values for the constants. The Freundlich and Langmuir model parameters determined from the isotherms for some of the contaminants evaluated herein are shown in Table 6.

TABLE 6

Freundlich and Langmuir Model Parameters

| Contaminant | Freundlich | Langmuir |
|---|---|---|
| Copper | K = 0.4064 mg/gm<br>n = 1.0218 | K = 142.91 mg/gm<br>b = 0.0029 l/mg |
| Nickel | K = 0.0300 mg/gm<br>n = 0.7500 | Negative Values |
| PCE | K = 0.07691 mg/gm<br>n = 0.6697 | Negative Values |

Figure 9:
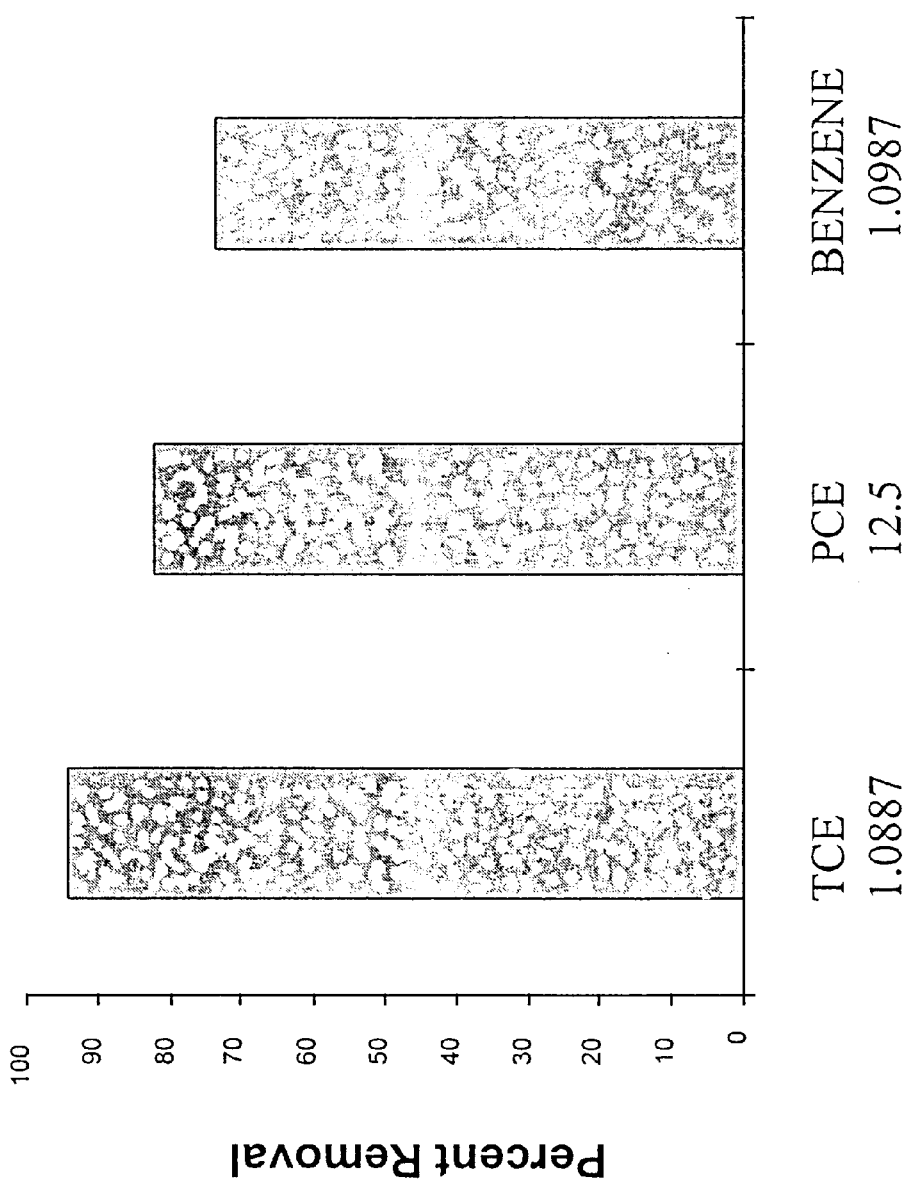
FIG. 9 shows removal of organic contaminants using HUMASORB™ according to the present invention.

Benzene adsorption on HUMASORB-S™ was represented very well by both the models at the relatively higher equilibrium concentrations obtained herein. The removal of PCE from spiked water was higher compared to the removal of both TCE and benzene under the conditions used for the development of the adsorption isotherms. However, removal of both TCE and benzene increased significantly with the increase in the amount of HUMASORB-S™, as shown in FIG. 9.

The adsorption of trichloroethylene (TCE) by humic acid was also evaluated using HUMASORB-L™ in the same manner and ratio as for benzene. TCE removal was only 55% at the end of two hours contact time, but removal increased to 61% with a contact time of 18 hours. The removal increased to 94% at the end of two hours when insoluble, acidified, purified humic acid (HUMASORB-S™) was used.

Accordingly, either soluble humic acid or insolubilized humic acid adsorbent, alone or together, can be used to remove organic contaminants from water by treating the water with the appropriate form of humic acid adsorbent and letting the water remain in contact with the humic acid adsorbent for a time sufficient to remove the organic contaminant. The time required to approximate equilibrium conditions for organic contaminants can be up to 24 hours.

Remediation of contaminated streams and groundwater has been traditionally approached with at least a two-step process including some combination of activated carbon and ion-exchange process. Removal of heavy metals from contaminated water has traditionally been accomplished by techniques such as adding a precipitating agent, ion-exchange or reverse osmosis. These techniques require considerable capital investment and, in addition, may require pretreatment in some case to remove oil and suspended solids.

The humic acid based adsorbent (HUMASORB™) of the present invention, which is derived from naturally occurring materials, can alleviate many of the limitations of the conventional remediation efforts into a single step process. The humic acid based adsorbents of the present invention can be used for groundwater cleanup both in situ and in a pump and treat process. The parameters for the cleanup process depend upon the particular contaminants and their concentration in the stream treated, and can be readily discerned by one skilled in the art without undue experimentation.

Contaminated groundwater is treated by using cross-linked humic acid (HUMASORB-CS™) placed into a cartridge or a trench. In this case the humate removes both metal ions and organics from the water in one step. If the water to be cleaned contains no monovalent ions to be removed, then humic acid made insoluble by complexing with multivalent metal ions may be used.

A cross-linked humic acid based adsorbent was used to treat a simulated waste stream containing both inorganic and organic contaminants in bath mode. The results shown in Table 7 clearly demonstrate that the cross-linked humic acid based adsorbent, HUMASORB-CS™) is very effective for remediation of water containing different types of contaminants.

TABLE 7

HUMASORB ™ IS EFFECTIVE FOR RADIONUCLIDE AND METAL REMOVAL FROM DIFFERENT MATRICES[1]

| | Simulated Waste[2]<br>Concentration (ppm) | | | Waste Stream from a<br>Superfund Site[3]<br>Concentration (ppm) | | |
|---|---|---|---|---|---|---|
| | Mixed Waste Stream Containing Multiple Metals and Chlorinated Organics | | | | | |
| Contaminant | Initial | Final | Removal % | Input | Output | Removal % |
| Chromium (III) | 88 | <0.5 | >99 | — | — | — |
| Copper | 98 | <0.5 | >99 | — | — | — |
| Lead | 18 | <0.5 | >97 | — | — | — |
| Trichloroethylene (TCE) | 140 | 1 | 99.29 | — | — | — |
| Perchloroethylene (PCE) | 26 | N.D. | >99 | — | — | — |

[1]Source of Data: ARCTECH, Inc. 14100 Park Meadow Drive, Chantilly, Virginia.
[2]Simulated waste stream with three metal and two chlorinated organic contaminants present.
[3]Treatability study using actual waste stream with multiple metals present.
N.D. Not Detected Alternatively, if it is not possible or desirable to elute the heavy metals and regenerate the adsorbent, the dried metal sequestrates can be combusted for process heat. The heavy metals are then concentrated in the combustion ash for recovery or disposal.

The process of the present invention provides a cost effective, one step process for treating mixed wastes containing organic compounds, metals and radionuclides. This one step process accomplishes the regulatory requirements for the treatment of EPA-classified priority pollutants resulting in a several fold reduction in the volume of the contaminated materials. The byproduct of the process is dry and is easily disposable. Alternatively, metals chelated by the process can be recovered by eluting under acid conditions. Alternatively, the metals can be made into a marketable, chelated, micronutrient agricultural product.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

All references cited in this specification are hereby incorporated by reference.

What is claimed is:

1. A method for insolubilizing humic acid comprising cross-linking solubilized humic acid.

2. The method according to claim 1, wherein the humic acid is cross-linked by contacting said humic acid with a cross-linking agent.

3. The method according to claim 2, wherein the cross-linking agent is selected from the group consisting of aldehydes and at least one oxidoreductase enzyme, and mixtures thereof.

4. The method according to claim 3, wherein said cross-linking agent is glutaraldehyde or a mixture of glutaraldehyde and a mineral acid.

5. An adsorbent comprising insolubilized humic acid immobilized on a solid support.

6. A method for insolubilizing humic acid comprising complexing or chelating multivalent metals to humic acid wherein the multivalent metals are selected from the group consisting of lead, cadmium, mercury, chromium, aluminum, iron, copper, and manganese.

7. An adsorbent comprising insolubilized humic acid immobilized on a solid support wherein the solid support used to immobilize the humic acid is selected from the group consisting of alginates, cross-linked dextran gels, agar, gellan, chitosan, and curdlan.

8. An adsorbent comprising insolubilized humic acid immobilized on a solid support wherein the solid support used to immobilize the humic acid is selected from the group consisting of polystyrene beads and acrolein beads.

9. An adsorbent comprising insolubilized humic acid immobilized on a solid support wherein the solid support used to immobilize the humic acid is a calcium/alginate matrix gel.

* * * * *